US011854045B2

(12) United States Patent
Amouris (10) Patent No.: US 11,854,045 B2
(45) Date of Patent: Dec. 26, 2023

(54) SYSTEM AND METHOD FOR CONSUMER-BASED STORING, RETRIEVING AND TRANSMITTING OF PROMOTIONAL CONTENT TO OTHER CONSUMERS

(71) Applicant: Konstantinos Amouris, Tinton Falls, NJ (US)

(72) Inventor: Konstantinos Amouris, Tinton Falls, NJ (US)

(*) Notice: Subject to any disclaimer, the term of this patent is extended or adjusted under 35 U.S.C. 154(b) by 106 days.

(21) Appl. No.: 14/449,604

(22) Filed: Aug. 1, 2014

(65) Prior Publication Data

US 2014/0344064 A1 Nov. 20, 2014

Related U.S. Application Data

(63) Continuation-in-part of application No. 14/341,065, filed on Jul. 25, 2014, now abandoned, which is a
(Continued)

(51) Int. Cl.
*G06Q 30/0251* (2023.01)
(52) U.S. Cl.
CPC .............................. *G06Q 30/0267* (2013.01)
(58) Field of Classification Search
CPC ....... G06Q 30/0207–30/0277; G06Q 30/0282; G06Q 30/02; G06Q 30/0631;
(Continued)

(56) References Cited

U.S. PATENT DOCUMENTS 6,085,100 A 7/2000 Tarnanen
7,664,516 B2 2/2010 Levi et al.
(Continued)

FOREIGN PATENT DOCUMENTS

WO WO 03/015430 A1 2/2003

OTHER PUBLICATIONS

System, Method and Computer Program Product for Presenting an Option To Receive Advertisement Content (Year: 2006).*
(Continued)

*Primary Examiner* — Gautam Ubale
(74) *Attorney, Agent, or Firm* — Konstantinos. A Models (57) ABSTRACT

A system and method for targeted delivery of promotional messages from a sender to a receiver are disclosed. The system includes a website providing access to a plurality of promotional messages, and comprises a web-based user interface enabling the sender to create a set of promotional targeting records. A promotional targeting record comprises the sender's communication identifier, a targeted destination's communication identifier, and a selected promotional message. The created promotional targeting records are stored in a database. After a communication transmission from the sender to the receiver, system application software is used to: obtain the communication identifiers of the sender and the receiver; search the database to identify a promotional targeting record with matching sender and receiver communication identifiers; and after identifying such a promotional targeting record, retrieve from the database and deliver to the receiver the promotional message associated with the identified promotional targeting record.

45 Claims, 6 Drawing Sheets

Related U.S. Application Data continuation of application No. PCT/US2013/023420, filed on Jan. 28, 2013.

(60) Provisional application No. 61/632,580, filed on Jan. 26, 2012, provisional application No. 61/688,780, filed on May 21, 2012.

(58) Field of Classification Search
CPC ............ G06Q 30/0619; G06Q 30/0267; H04L 51/00; H04W 4/18; H04W 4/14
USPC ........................................................ 705/14.16
See application file for complete search history.

(56) References Cited

U.S. PATENT DOCUMENTS

| | | | |
|---|---|---|---|
| 2002/0060246 A1* | 5/2002 | Gobburu | G06Q 20/04 235/462.46 |
| 2006/0206819 A1 | 9/2006 | Tsuji et al. | |
| 2007/0016921 A1* | 1/2007 | Levi | G06Q 30/02 725/35 |
| 2007/0198342 A1 | 8/2007 | Collison et al. | |
| 2007/0198343 A1 | 8/2007 | Collison et al. | |
| 2007/0198344 A1 | 8/2007 | Collison et al. | |
| 2007/0198921 A1 | 8/2007 | Collison et al. | |
| 2007/0208611 A1 | 9/2007 | Collison et al. | |
| 2008/0091529 A1 | 4/2008 | Bailey et al. | |
| 2008/0160956 A1* | 7/2008 | Jackson | H04M 3/02 455/406 |
| 2008/0287150 A1 | 11/2008 | Jiang et al. | |
| 2009/0017804 A1* | 1/2009 | Sarukkai | G06Q 30/0272 455/414.3 |
| 2009/0030772 A1* | 1/2009 | Flake | G06Q 50/01 705/319 |
| 2009/0192900 A1 | 7/2009 | Collison et al. | |
| 2009/0203359 A1* | 8/2009 | Makhoul | H04M 3/4878 455/412.2 |
| 2009/0215476 A1* | 8/2009 | Tysowski | H04L 51/04 455/466 |
| 2009/0298480 A1* | 12/2009 | Khambete | G06F 16/9535 709/224 |
| 2009/0312040 A1 | 12/2009 | Gupta et al. | |
| 2010/0063872 A1* | 3/2010 | Patel | G06Q 30/0207 705/14.1 |
| 2010/0121774 A1* | 5/2010 | Benzon | H04W 4/14 705/347 |
| 2011/0119131 A1* | 5/2011 | Levi | G06Q 30/0255 705/14.58 |
| 2011/0275346 A1* | 11/2011 | Fraser | H04M 3/4878 455/408 |

OTHER PUBLICATIONS

Zero-Cost_Negative-Cost_ZCNC_mobile_messaging (Year: 2008).*
An Analysis of the Skype Peer-to-Peer Internet Telephony Protocol (Year: 2004).*
PCT International Search Report and Written Opinion dated Apr. 9, 2013 for PCT/US2013/023420, now WO 2013112987.
"Google+4:Website4.2:Circles: From Wikipedia, the free encyclopedia", http://en.wikipedia.org/wiki/Google%2B#Circles.
Get Ready for the SMS Advertising Revolution, By David Murphy l on Jun. 17, 2009, http://mobilemarketingmagazine.com/get-ready-sms-advertising-revolution/.
Overcoming Challenges To Capture Mobile Ad DollarsMon, Nov. 10, 2008—5:42pm,Alan Pascoe, http://www.wirelessweek.com/articles/2008/11/overcoming-challenges-capture-mobile-ad-d.
Source: Amobee Media Systems,Aug. 6, 2008 13:40 ET, Mobile Advertising: Orange Innovates With In-SMS Ads Concept, http://www.marketwired.com/press-release/mobile-advertising.
Source: Mobhappy.com, Will Peer-to-Peer SMS Advertising be Huge?by Russell Buckley on Sep. 11, 2008 in Analysis, http://mobhappy.com/blog1/2008/09/11/will-peer-to-peer-sms-adv.
Gtext Media: "They Text. You Ad-Link. They Receive", http://gtextmedia.wordpress.com/.
Gtext Media Launches in-SMS Ad Solution, By David Murphy l on Mar. 7, 2011, http://mobilemarketingmagazine.com/gtext-media-launches-sms-ad-solution/.
Gtext Media iPhone App Review:, https://www.youtube.com/watch?v=Z6GgEMas1d8.
"TexTango wants to send ads with personal text messages" Posted by Mark Whittaker on Jul. 16, 2010 in Mobile, Social, http://aimgroup.com/2010/07/16/textango-wants-to-send-ads-.
Shervin, TexTango v1.6.33, Updated Nov. 10, 2011, http://slideme.org/application/textango.
Application Review: Tex Tango: Uploaded on Feb. 1, 2011, https://www.youtube.com/watch?v=WofckYMFht4.
Dickson, Google's wake-up call: We don't have SMS advertising capability, Telecoms.com, Nov. 2009, 9 pgs.
Gupta, MessageCast to Insert Ads in Text Messages, Online Media Daily, Jan. 2005, 3 pgs, www.mediapost.com/publications/article/26310messagecast.
Eyeline.mobi, Eyeline Sharp Ads, Insert relevant ads in SMS and USSD messages, www.eyeline.mobi/products/eyeline-sharp-ads.

* cited by examiner

SYSTEM AND METHOD FOR CONSUMER-BASED STORING, RETRIEVING AND TRANSMITTING OF PROMOTIONAL CONTENT TO OTHER CONSUMERS

CROSS-REFERENCE TO RELATED APPLICATIONS

This application is a continuation-in-part of U.S. application Ser. No. 14/341,065, filed on Jul. 25, 2014, which is a continuation of International Application No. PCT/US2013/023420, filed on Jan. 28, 2013, which claims priority to U.S. Provisional Patent Application Ser. No. 61/632,580, filed on Jan. 26, 2012, and U.S. Provisional Patent Application Ser. No. 61/688,780, filed on May 21, 2012. The entire disclosure of each of these referenced applications is hereby incorporated by reference.

TECHNICAL FIELD

Peer-to-Peer advertising between mobile communication devices.

BACKGROUND

The presently disclosed system and method relate to the field of peer-to-peer advertizing that is facilitated by the heavy usage of highly sophisticated two-way communication systems, and more particularly by the continuously increasing usage of cell phones.

It is becoming increasingly evident that usage of texting has exploded over the period of the last 5-10 years, and it has become the most frequently used means of communication between cell phone users. This presents a tremendous opportunity for advertisers that can leverage both the frequency and communication mechanics of texting to deliver personalized advertisements and offers to prospective customers.

One set of the prior art (Levi et al: US 20110119131, U.S. Pat. No. 7,664,516, US 20070016921) discloses a first system and method for delivering advertisement messages selected via an intermediary website by the source of a peer-to-peer communication exchange, in conjunction with participating advertisers, to the destination of said communication exchange.

That system leverages the relationship that exists between the sender and the receiver in order to make the received advertisements more likely to be viewed since they come from a 'trusted' source. Consequently, this increases the likelihood of purchase of the product or service featured in the advertisement by the receiver of the advertisement.

The major limitation of that system is that it lacks a precise targeting mechanism to direct specific advertisements and promotional offers to specific destinations based on the unique knowledge that the sender has about the particular interests, needs, likes and dislikes of each particular destination that he/she communicates with. This results in inefficient distribution of advertisements and promotional offers, since while a selected advertisement/promotional offer may be a good match for destination X, it may not be a good match for destination Y.

The second limitation of that system is that it requires that both the sending and receiving devices are equipped with the operating system, memory, and processing power to run a sophisticated point-to-point application agent that is capable of downloading and transmitting advertisements to a given destination before, during, or after communication exchange. While this may hold true for smart phones or tablets, it is not true for the lower end mobile phones that are just capable of making/receiving phone calls and sending/receiving text messages. As a result, the scalability of the prior art system is inherently limited due to a significant percentage of the population still using lower end mobile phones.

Another disadvantage of that system is that it relies on downloading of advertising content to the phone from an external server accessible through the internet. As mobile phones are becoming increasingly susceptible to viruses and hacking attacks due to their continuously increasing utility to conduct financial transactions and mobile banking, frequently downloading advertising content from the internet increases the likelihood of the mobile phone doing the downloading getting infected with malicious software compromising the security of the data stored in the mobile phone.

Another set of the prior art (Fraser, Jeffrey B. et al.: US 20110275346) discloses a second system that intercepts a peer-to-peer communication and subsequently sends an advertisement or promotional message to one or both of the communicating parties based upon certain predefined conditions.

The limitation of the second system is that it lacks the element of personalization, since the communication participants do not have any input on the nature of the advertising or promotional content that is being sent and received, therefore making the delivered advertisements and promotional offers much less likely to be viewed and acted upon.

Therefore, what is needed is a sender-based peer-to-peer promotional targeting system that directly leverages the knowledge a sender has about the purchasing interests and habits of the receiver, and therefore overcomes all of the above limitations and disadvantages, significantly improving the degree of personalization and therefore the effectiveness of using peer-to-peer communications as a vehicle for delivering promotional offers.

SUMMARY

The present disclosure provides a system for targeted delivery of promotional messages sent over a communication network from a sender associated with a source communication identifier to a receiver associated with a destination communication identifier identifying a unique communication data storage resource.

The targeting of the promotional message delivery is done by the sender through a website hosted by at least one computing device. The website provides access to a plurality of promotional messages, and comprises a web-based user interface that enables the sender to create a set of promotional targeting records, where each promotional targeting record comprises a source identifier field set equal to the source communication identifier, a destination identifier field set equal to a target destination communication identifier, and a promotional message chosen from the plurality of promotional messages.

The system further comprises a database that stores the promotional targeting records created by the sender through the website.

Furthermore, the system comprises application software for performing the following steps after initiation of a communication transmission between the sender and the receiver:

Obtaining the source communication identifier associated with the sender and the destination communication identifier associated with the receiver, and searching the database to identify at least one promotional targeting record satisfying the following logic conditions: the value of the source identifier field in the identified at least one promotional targeting record is equal to the obtained source communication identifier, and the value of the destination identifier field in the identified at least one promotional targeting record is equal to the obtained destination communication identifier;

After identifying at least one promotional targeting record that satisfies the above logic conditions, retrieving from the database and delivering to the communication data storage resource identified by the destination communication identifier the promotional message associated with the identified at least one promotional targeting record.

BRIEF DESCRIPTION OF THE DRAWINGS

The presently disclosed system and method is described below in greater detail with reference to the accompanying drawings, in which.

For purposes of the following discussion, letters are accompanying certain numerals in the figures in order to distinguish between different instances of the same element or component.

DETAILED DESCRIPTION

The present disclosure provides for targeted delivery of promotional messages between a sender associated with a source communication identifier and a receiver associated with a destination communication identifier.

In the following discussion of the disclosed system and method, a number of acronyms and abbreviations are used, which are listed here for convenience of reference.

WUI: Web-based User Interface is a type of user interface that accepts input and provides output by generating web pages which are transmitted via the Internet and viewed by the user using a web browser program.

SMS: Short Message Service is a form of text messaging often used on mobile communication devices.

SMSC: A Short Message Service Center is a network element in mobile communication networks that processes SMS messages.

P2P: Peer-to-Peer networking is based on a distributed architecture that can distribute workload among a number of peers in the network.

SS7: Signaling System #7 is a signaling protocol for PSTN networks to implement call setup and control.

Figure 1:
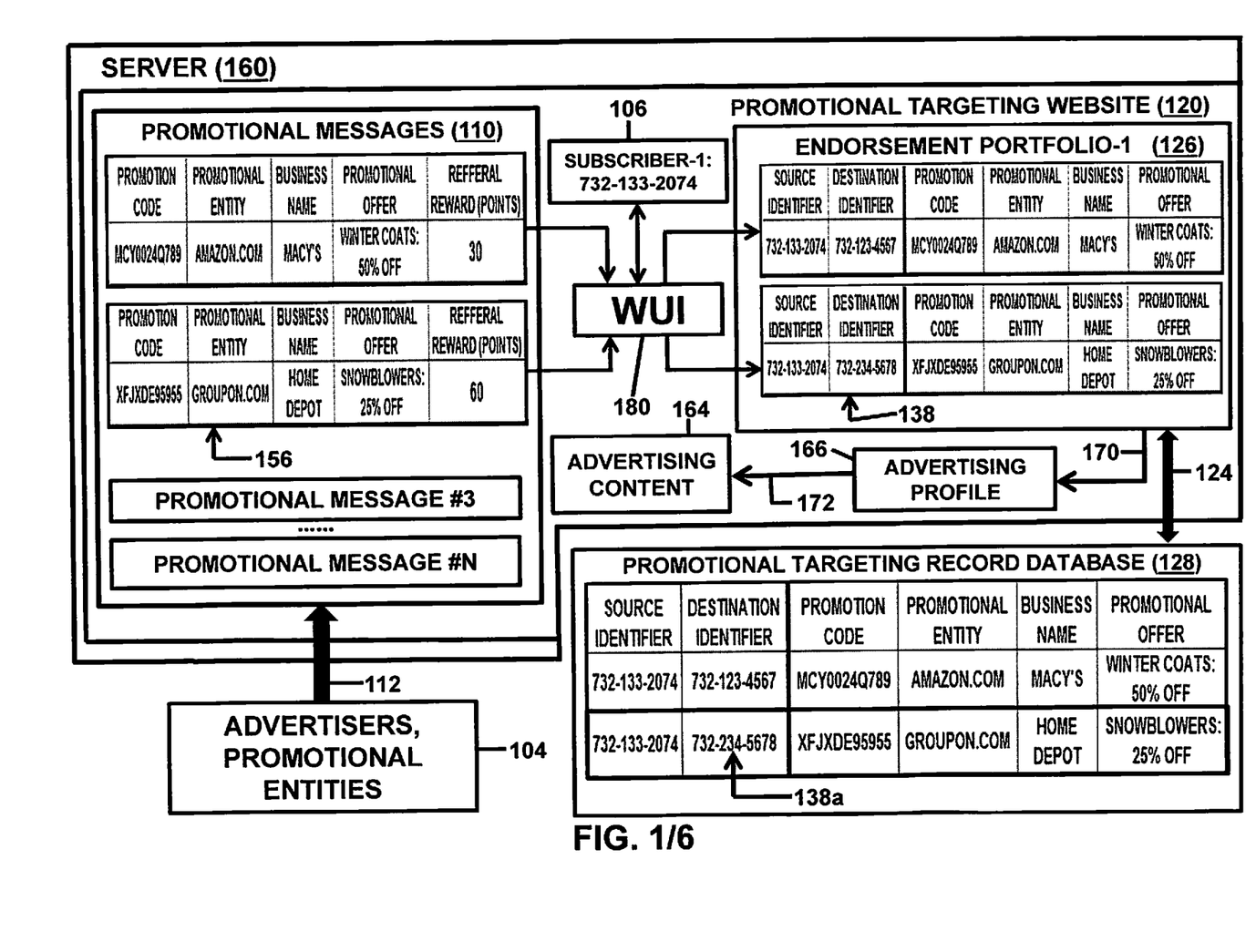
FIG. 1 is a block diagram illustrating components of a promotional message targeting system in accordance with an embodiment of the disclosed system and method.

FIG. 1 is a block diagram illustrating components of a promotional message targeting system in accordance with an embodiment of the disclosed system and method. More specifically, FIG. 1 illustrates a promotional targeting website 120 maintained by at least one computing device, where the at least one computing device can be a server, a personal computer, a microprocessor, etc. In the present embodiment of the disclosed system, the at least one computing device is a computer server 160.

The promotional targeting website 120 allows a prospective subscriber 106 to create a login account and subsequently login and view a set of promotional messages 110 created and uploaded from a group of advertisers and promotional entities 104 (i.e., Amazon.com, Groupon.com), etc. The login account created by each subscriber may be uniquely associated with the subscriber's 106 mobile phone number.

The set of promotional messages 110 to be made accessible to the promotional targeting website 120 subscriber community are uploaded to the server 160 maintaining the website via a web-based user interface 112 that is accessible by the community of advertisers and promotional entities 104.

With continuing reference to FIG. 1, a promotional message 156 comprises the following elements:
  a) Promotion code: An alphanumeric code uniquely identifying the promotional message.
  b) Promotional entity: Name of the promotional entity that is issuing the promotional message. In some cases, the entity issuing the promotional message may be different from the original business making the product or providing the service that is featured in the promotional message. This is the case with internet retailer companies such as Amazon.com (or Groupon.com) that act as intermediaries between online shoppers and businesses.
  c) Business name: Name of the business making the product or providing the service featured in the promotional message.
  d) Featured product or service: The featured 'service' may be any one of a multitude of things such as dinner at a neighborhood restaurant, tickets to a movie being promoted, membership to a neighborhood gym, oil change at a local gas station, legal advice from a local law firm, a car insurance company, a bank, an investment brokerage company, etc.
  e) Promotional offer: A promotional offer related to the product or service, such as a discount that the buyer will get when he/she redeems the promotional offer by purchasing the product or service associated with the promotional message. The discount may be structured such that it contains a coupon component and a rebate component. The coupon component of the discount may be collected immediately by the buyer at the Point of Sale without any additional action required, while the rebate component of the discount will require the buyer to submit Proof of Purchase (PoP) to the promotional entity that is associated with the redeemed promotional offer.

f) Referral reward: A referral reward (i.e., offered sender reward points) to be delivered to the subscriber that did the 'targeting' of the redeemed promotional message to the buyer. The referral reward could also be broken into an 'instant' component and a 'rebate' component, where the instant component is immediately delivered to the sender following transmission of the promotional message to the receiver, and the rebate component is delivered contingent on the buyer providing evidence of redemption of the promotional offer (i.e., PoP).

Additionally, the promotional message may contain a web link that will direct the receiver to a web page containing additional information about the promotional offer, such as images of the product or further restrictions associated with the promotional offer.

The promotional targeting website 120 comprises a Web-based User Interface 180 (WUI) that allows each subscriber to search for promotional messages using various search criteria such as the size and structure of the referral reward, the size and structure of the promotional offer, the product or service category (i.e., movies, electronics, fragrances, etc), and the brand/business name. Furthermore, the promotional targeting website 120 comprises a WUI 180 that enables each subscriber to create promotional targeting records.

A promotional targeting record 138 is a data structure comprising the following elements:
  a) A source identifier field whose value is set to the subscriber's mobile phone number,
  b) A selected promotional message to be associated with the promotional targeting record, and
  c) A destination identifier field whose value is set to a target destination mobile phone number to which the selected promotional message may be forwarded to when the subscriber sends an SMS message to the user associated with the destination mobile phone. This element maximizes personalization of the forwarded promotional message due to the unique knowledge the subscriber/sender has about the consumer habits of the person receiving the promotional offer, and consequently it maximizes the likelihood that a forwarded promotional offer will be redeemed.

The totality of the currently present promotional targeting records created by a subscriber 106 makes up the subscriber's endorsement portfolio 126. The promotional targeting website's WUI 180 is capable of displaying each subscriber's endorsement portfolio 126 in a tabulated format similar to the web-based user interfaces used by various investing websites to display the stock and bond portfolios of their individual investors.

In addition, the promotional targeting website's WUI 180 allows each subscriber 106 to modify his/her endorsement portfolio 126 by adding and/or deleting promotional targeting records from his/her endorsement portfolio 126 similar to the WUIs used by various investing websites that allow their investors to add and/or remove stock symbols from their stock portfolios.

The server 160 maintaining the promotional targeting website 120 is running application software that may display advertising content 164 on the promotional targeting website 120 before a particular subscriber is able to save the changes he/she has made to their endorsement portfolio 126. The advertising content 164 to be displayed may be selected based on a personalized advertizing profile 166 that is uniquely associated with the subscriber 106, where the personalized advertising profile 166 may be constructed by taking into account 170 the combined set of:

a) The promotional targeting records that the particular subscriber has created for targeted promotional message delivery to his/her friends (i.e., endorsement portfolio 126), and
  b) The promotional targeting records for which the particular subscriber 106 has been designated as the 'target' by his/her friends who are in frequent communication with the particular subscriber.

The endorsement portfolio 126 created by each subscriber of the promotional targeting website 120 is being stored in a promotional targeting record database 128 that is communicatively coupled 124 to the server 160 maintaining the promotional targeting website 120, such that the contents of the promotional targeting record database 128 are kept concurrent with the most recent version of each subscriber's endorsement portfolio 126.

The promotional targeting records stored in the database are searchable and retrievable by a query comprising the mobile phone numbers of the source and destination involved in an SMS communication. In the event there are multiple promotional targeting records associated with the same target destination mobile phone number, the subscriber creating those records can specify rules for determining the order in which promotional targeting records should be retrieved. For example, the retrieval order could be round-robin so that each promotional targeting record is retrieved exactly once in a sequential order. Alternatively, the subscriber could assign a retrieval 'weight' designation to each promotional targeting record, so that a particular record is retrieved a specified percentage of the time relative to the other promotional targeting records with the same target destination identifier in his/her endorsement portfolio. Furthermore, the promotional targeting record retrieval rules could be based on other factors such as the time at which the database is being queried.

Figure 2:
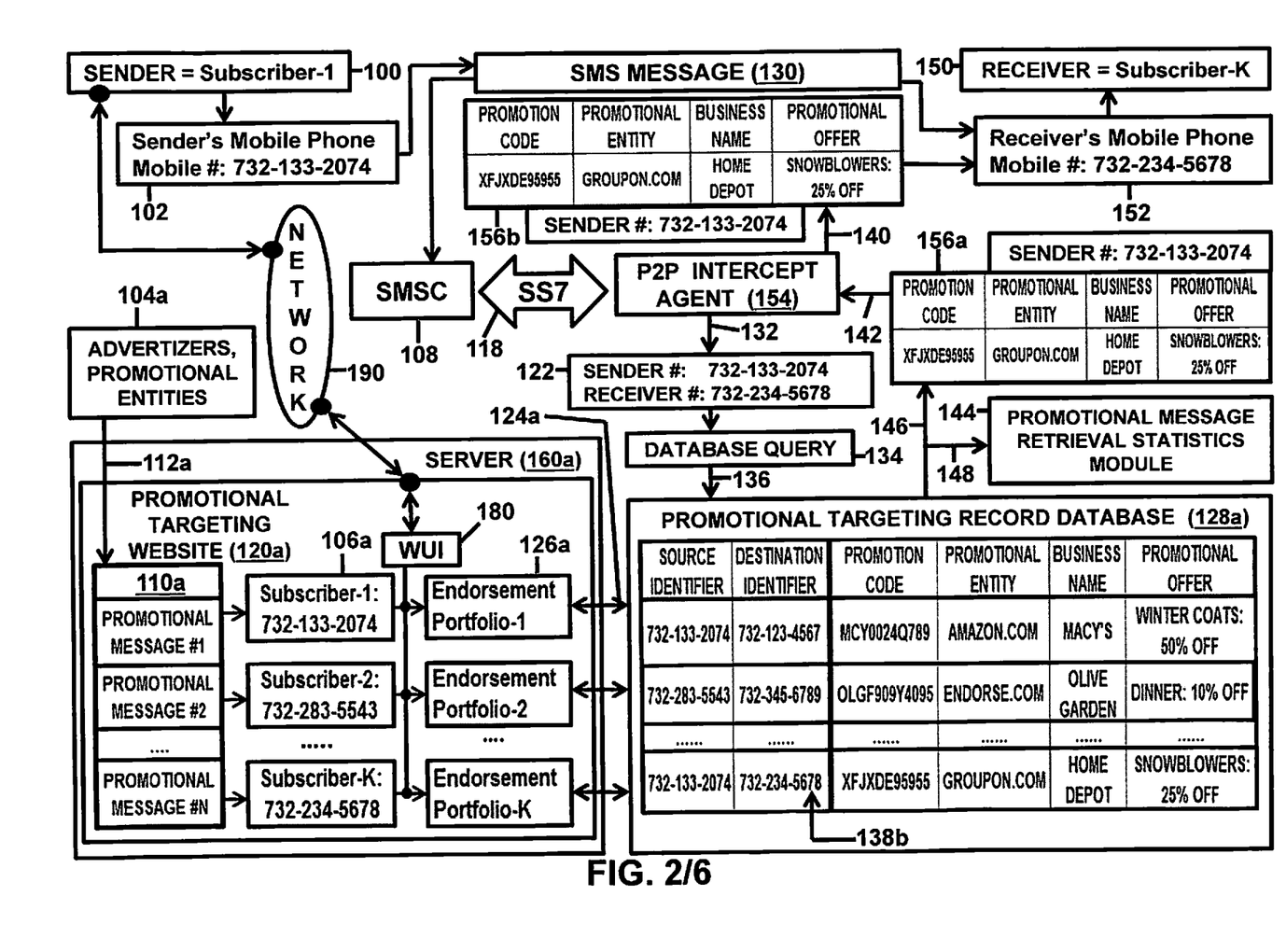
FIG. 2 is a block diagram illustrating an end-to-end promotional message targeted delivery system from a sender to a receiver in accordance with a first embodiment of the disclosed system and method.

FIG. 2 is a block diagram illustrating an end-to-end promotional message targeted delivery system from a sender 100 associated with a source communication identifier 102 to a receiver 150 associated with a destination communication identifier 152 in accordance with an embodiment of the disclosed system and method.

Referring now to FIG. 2, the sender 100, who is also subscriber-1 106 of the promotional targeting website 120, creates an SMS message 130 and sends it to the intended receiver 150. Subsequently, the SMS message 130 goes through the SMSC 108 where a P2P intercept agent 154 interacting with the SMSC 108 via an SS7 signaling link 118 intercepts the SMS message 130 and obtains 132 the set of source and destination mobile phone numbers 122 involved in the intercepted SMS communication.

Subsequently, a database query 134 comprising the obtained source and destination mobile phone numbers 122 of the intercepted SMS message 130 is then constructed and used to search 136 the database 128a in order to identify a promotional targeting record satisfying the following logic conditions:

a) The value of the source identifier field in the identified promotional targeting record is equal to the obtained source mobile phone number, and
  b) The value of the destination identifier field in the identified promotional targeting record is equal to the obtained destination mobile phone number.

When a promotional targeting record satisfying the above conditions 138b is identified, the promotional message 156a associated with the identified promotional targeting record 138b is retrieved 146 from the database 128a and delivered to the P2P intercept agent 154 who subsequently delivers 140 it to the destination mobile phone 152 used by the receiver 150. The P2P intercept agent 154 may be configured to package the retrieved promotional message 156b together with the SMS message 130 that triggered the promotional message retrieval and deliver both messages packaged together, or it may be configured to deliver the retrieved promotional message 156b as a separate SMS message; in the latter case (i.e., separate delivery), the P2P intercept agent 154 will insert the sender's mobile phone number to the separate SMS message carrying the delivered promotional message 156b so that the receiver 150 can later identify who the sender was.

The retrieved promotional message 156a together with the sender's mobile phone number are also being forwarded to a promotional message retrieval statistics module 144 that keeps various statistics on each promotional message retrieved from the database 128a, such as (but not limited to):

1) The total number of times it has been retrieved for transmission, for all senders,
2) The total number of different receivers it has been received by,
3) The total number of different senders that it has been forwarded by,
4) The number of times it has been retrieved for transmission, for each individual sender,
5) The number of different receivers it has been received by, for each individual sender.

Statistics (4) and (5) may then be used by the promotional entity that created each promotional message to calculate a nominal 'transmission' reward to be delivered to each individual sender.

The collected promotional message retrieval statistics 144 may be used by the mobile network operator whose network is being used to facilitate the communication transmission from the sender 100 to the receiver 150, for the following purposes:

a) Charging the group of advertisers and promotional entities 104 creating the promotional messages in a manner proportional to the retrieval volume 144 associated with each promotional message, similar to the 'click-rate' associated with advertisements and promotional offers that are posted on a web-page.
b) Informing the promotional entities 104 creating the set of promotional messages 110 about the effectiveness of their promotional campaigns.

It is understood that FIG. 2 is intended as an example, and not as an architectural limitation for different embodiments of the present disclosure. For example, the communication transmission between the sender and the receiver can be a voice call, a video-conference call, or an e-mail transmission where in the e-mail case the source and destination communication identifiers refer to e-mail addresses associated with storage memory resources residing on a remote computer e-mail server.

Figure 3:
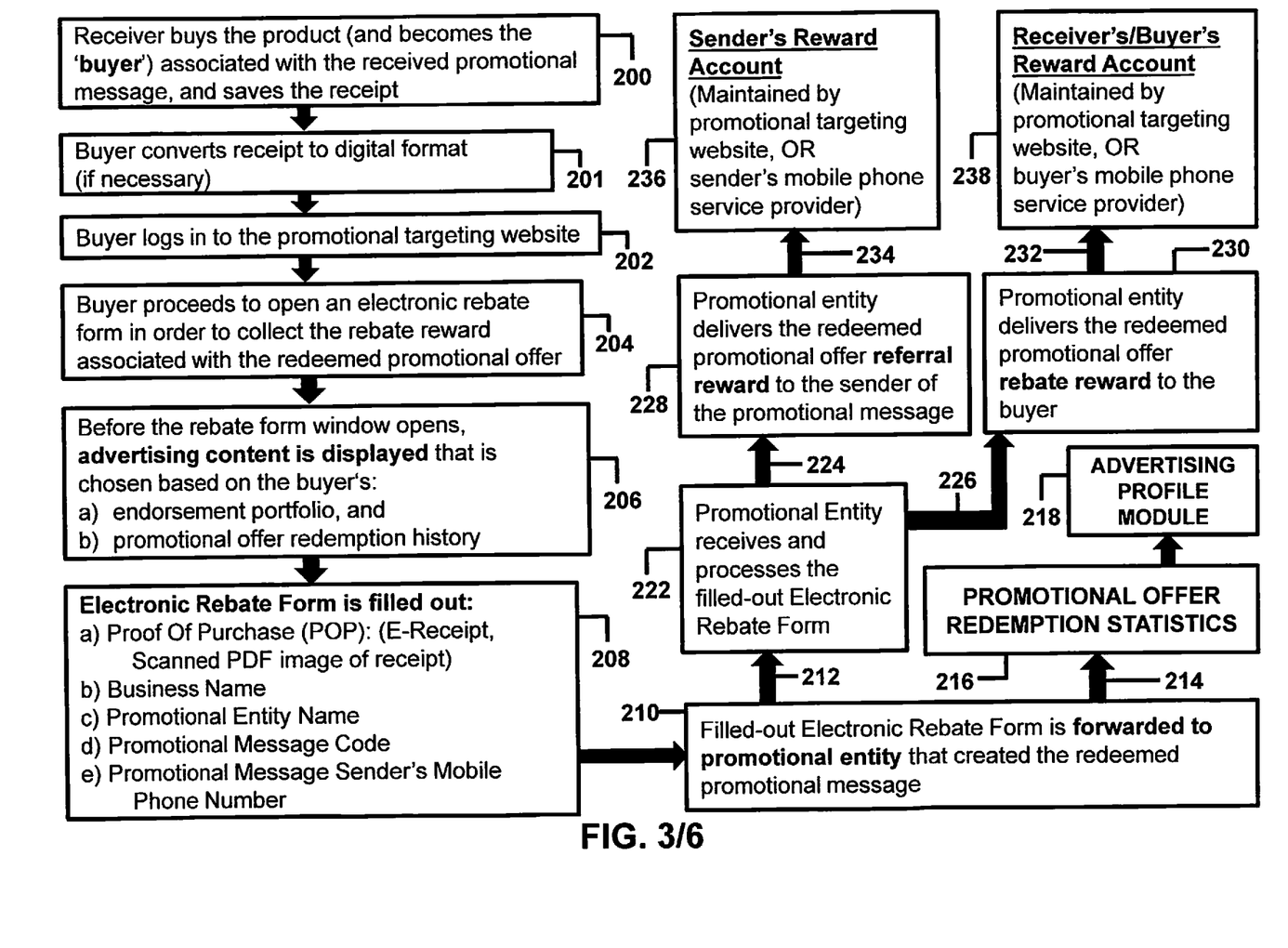
FIG. 3 is a process flow diagram illustrating a promotional message reward delivery process in accordance with an embodiment of the disclosed system and method.

FIG. 3 is a process flow diagram illustrating the process of how the referral and rebate rewards associated with a redeemed promotional offer are delivered to the sender 100 and receiver 150 (henceforth referred to as 'buyer'), respectively.

Referring now to FIG. 3, the reward delivery process begins with the buyer of the product or service featured in the redeemed promotional offer collecting a receipt 200 proving that the purchase actually took place (i.e., Proof of Purchase). In the present disclosure, the promotional targeting website's 120 WUI 180 enables the buyer 150 to electronically submit the PoP through the website 120. In order to use this feature, the buyer needs to first convert 201 the receipt to an acceptable digital format so that it can be uploaded to the server 160 maintaining the website 120 using the promotional targeting website's WUI 180.

Acceptable digital formats of a receipt may be one of (but not limited to) the following:

a) An E-Receipt (i.e., digital receipt) sent from the retailer to a chosen e-mail account of the buyer. Macy's is one example of a major retailer that has started to implement the E-Receipt functionality. This is the easiest way to 'digitize' a receipt since it's already done by the retailer and the buyer doesn't need to do anything else, other than retrieve it from his/her e-mail records.
b) A scanned PDF (Portable Document Format) image of the receipt. There are a number of receipt scanning devices in the market that can scan receipts of different sizes and formats, and allow the user to easily organize them electronically in different folders without having to worry about losing the actual paper receipt.

Once the receipt has been transformed to a digital format, the buyer 150 logs in 202 to his/her account maintained by the promotional targeting website 120, and using the website's WUI 180, proceeds to open/create 204 a new electronic (web-based) rebate form.

The website 120 may then display 206 advertising content before the buyer can fill out the electronic/web-based rebate form. The displayed advertizing content may be reflective of the buyer's prior promotional offer redemption history and/or the combined set of promotional targeting records having the buyer as their 'target' (i.e., records having a destination identifier field equal to the buyer's communication identifier) and the buyer's own promotional targeting records. Promotional targeting records having a particular website subscriber as their target can provide useful information about what the particular subscriber's friends may think the subscriber would be more likely to purchase.

The electronic/web-based rebate form 208 comprises the following elements:

1. Proof of Purchase (PoP) of the product or service featured in the redeemed promotional offer. The PoP comprises the digital version of the receipt. Additional elements may need to be submitted, such as a UPC bar code associated with the purchased product.
2. Name of the business making the product or providing the service in the redeemed promotional offer.
3. Name of the promotional entity that issued the promotional message.
4. The alphanumeric code identifying the promotional message, and
5. The mobile phone number of the sender whose text message triggered delivery of the redeemed promotional offer to the buyer of the product or service featured in the offer.

The application software running on the server 160 maintaining the promotional targeting website 120 then forwards 210 the completed electronic rebate form to the promotional entity (Groupon.com for this particular illustration) that created the redeemed promotional message, so that the promotional entity can deliver the promotional message rewards to the receiver/buyer 150 and sender 100 of the promotional message 156.

The reward delivery mechanism can be implemented via a rewards account (points, or dollars) that is maintained on behalf of each website subscriber by either the website administrator or the subscriber's mobile network service provider. The reward account may further be split into a dollar reward sub-account and a point reward sub-account in order to be able to receive rewards with different structures.

Once the completed electronic rebate form 208 is received and processed 222 by the appropriate promotional entity, the promotional entity (Groupon.com for this particular illustration) then does the following:

a) Delivers the rebate reward 230 (referring back to FIG. 2, this would be the "25% OFF" discount from the purchased snow blower's final sale price contained in the 'promotional offer' component of the delivered promotional message 156b) to the buyer's reward account 238 of the product (snow blower in this example) or service featured in the redeemed promotional offer, and b) Delivers the referral reward 228 (referring back to FIG. 1, this would be the 'referral reward (points)' component of the promotional message 156, which in this example is 60 reward points) to the sender's reward account 236.

In accordance with an alternative embodiment of the disclosed system and method, the intercepting of communication transmissions and subsequent attaching of promotional messages (to the intercepted communication transmissions) is done within the communication device originating the communication transmission that is being intercepted. One benefit of doing the intercepting and attaching locally (i.e., inside the sending communication device), as opposed to remotely (i.e., outside the sending communication device), is that no modifications need to be made to the existing communication switching infrastructure.

Figure 4:
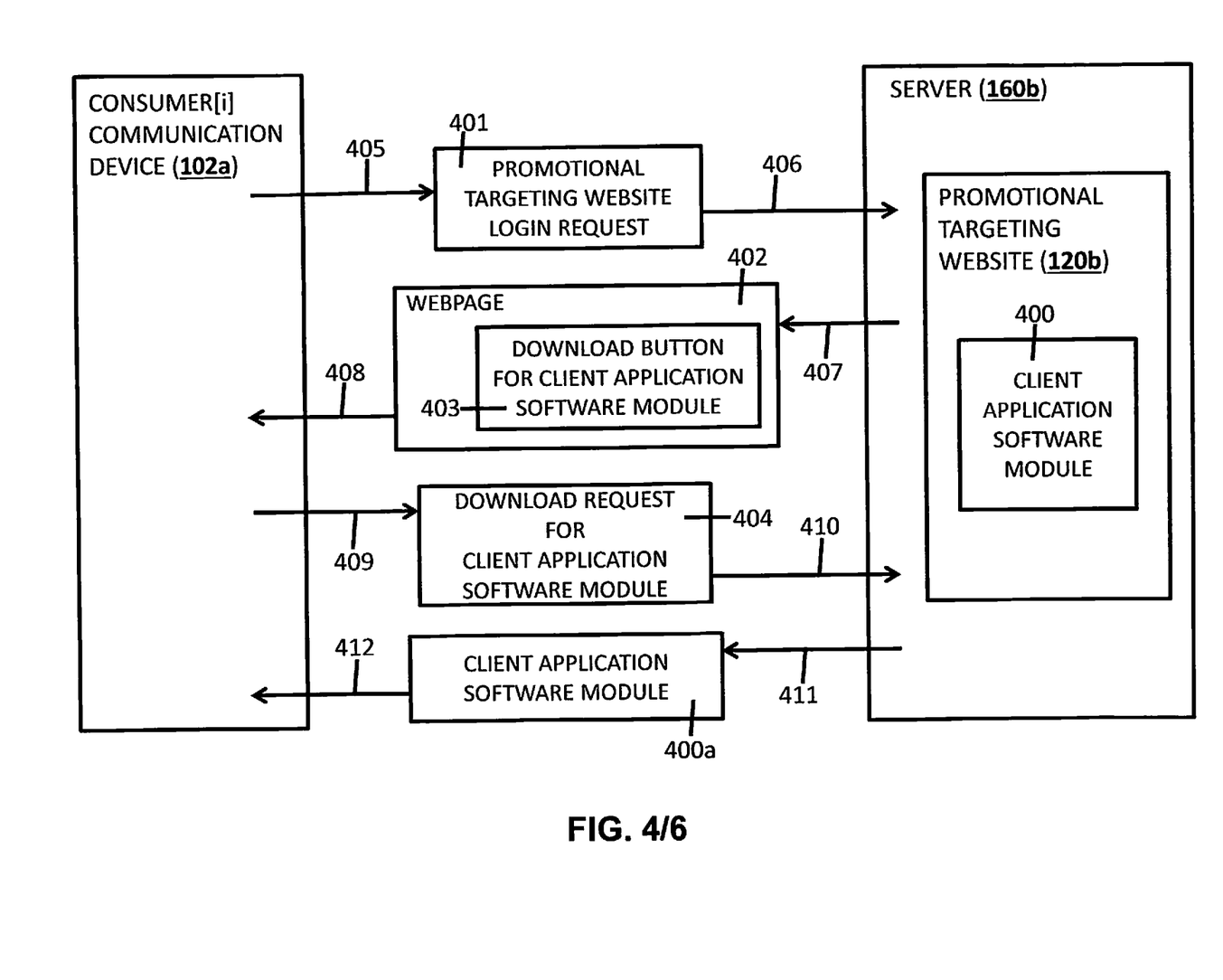
FIG. 4 is a process flow diagram illustrating the process by which a sender can download to his/her mobile communication device a Client Application Software Module (CASM) that is available on the promotional targeting website.

FIG. 4 is a process flow diagram illustrating the process by which a website subscriber 106 can download to his/her mobile communication device 102a a Client Application Software Module (CASM) 400 that is available on the promotional targeting website 120b. The CASM 400 allows the subscriber 106 to download the latest contents of his/her endorsement portfolio 126 to his mobile communication device 102a. More detail for this process is provided in the discussion of FIG. 5 following below.

Referring now to FIG. 4, once the subscriber logs in to his/her website account (by sending a login request 401 from his/her mobile communication device 102a to the server 160b maintaining the promotional targeting website 120b), he/she can get access to the contents of the website via a webpage 402 that is received 408 at the communication device 102a. Among the contents of the received webpage is an icon (or 'button') 403 that enables the subscriber to initiate the process of downloading the CASM 400 to his/her communication device. Once the server 160b receives 410 the CASM download request 404 from the subscriber's mobile device 102a, it proceeds to send 411 the CASM 400 to the subscriber's mobile device.

Figure 5:
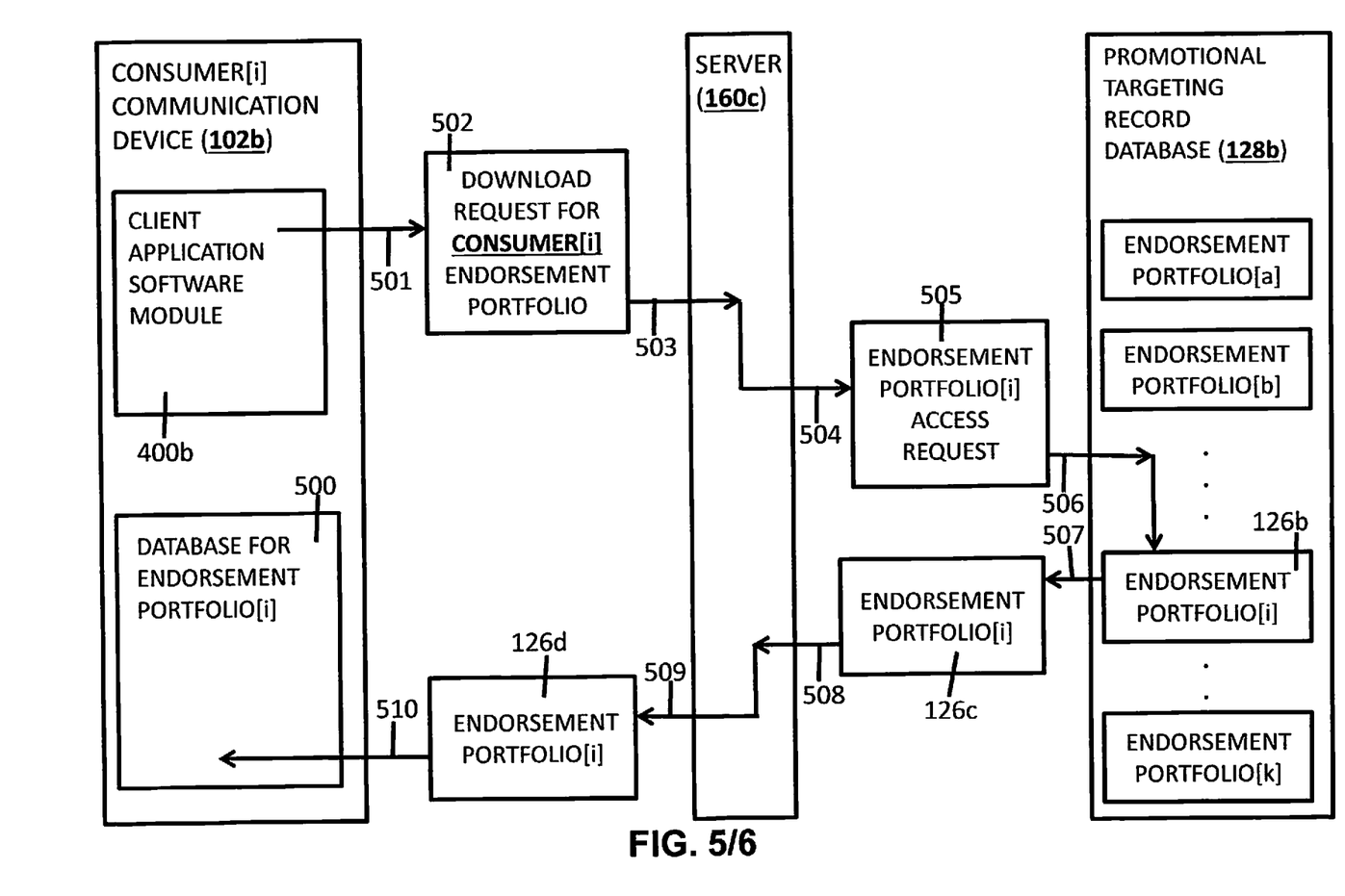
FIG. 5 is a process flow diagram illustrating the process by which a sender downloads the most recent contents of his/her endorsement portfolio to his/her mobile communication device.

FIG. 5 is a process flow diagram illustrating the process by which a (website) subscriber downloads the most recent contents of his/her endorsement portfolio to his/her mobile communication device.

Referring now to FIG. 5, once the subscriber has initiated execution of the CASM 400b on his/her device, the CASM sends 501 a download request 502 for the subscriber's endorsement portfolio 126b to the server 160c maintaining the website. The endorsement portfolio download request 502 comprises the identifier associated with the subscriber. Upon receiving 503 the endorsement portfolio download request 502, the server 160c sends 504 an access request 505 to the database 128b for the contents of the subscriber's endorsement portfolio 126b; once the server receives 508 the subscriber's endorsement portfolio contents 126c it goes ahead and sends 509 them 126d to the subscriber's mobile communication device 102b. Upon reception 510 of the received endorsement portfolio contents 126d, they are stored in a local database 500 residing within the subscriber's communication device 102b that is configured to perform storing and retrieving of promotional targeting records.

Figure 6:
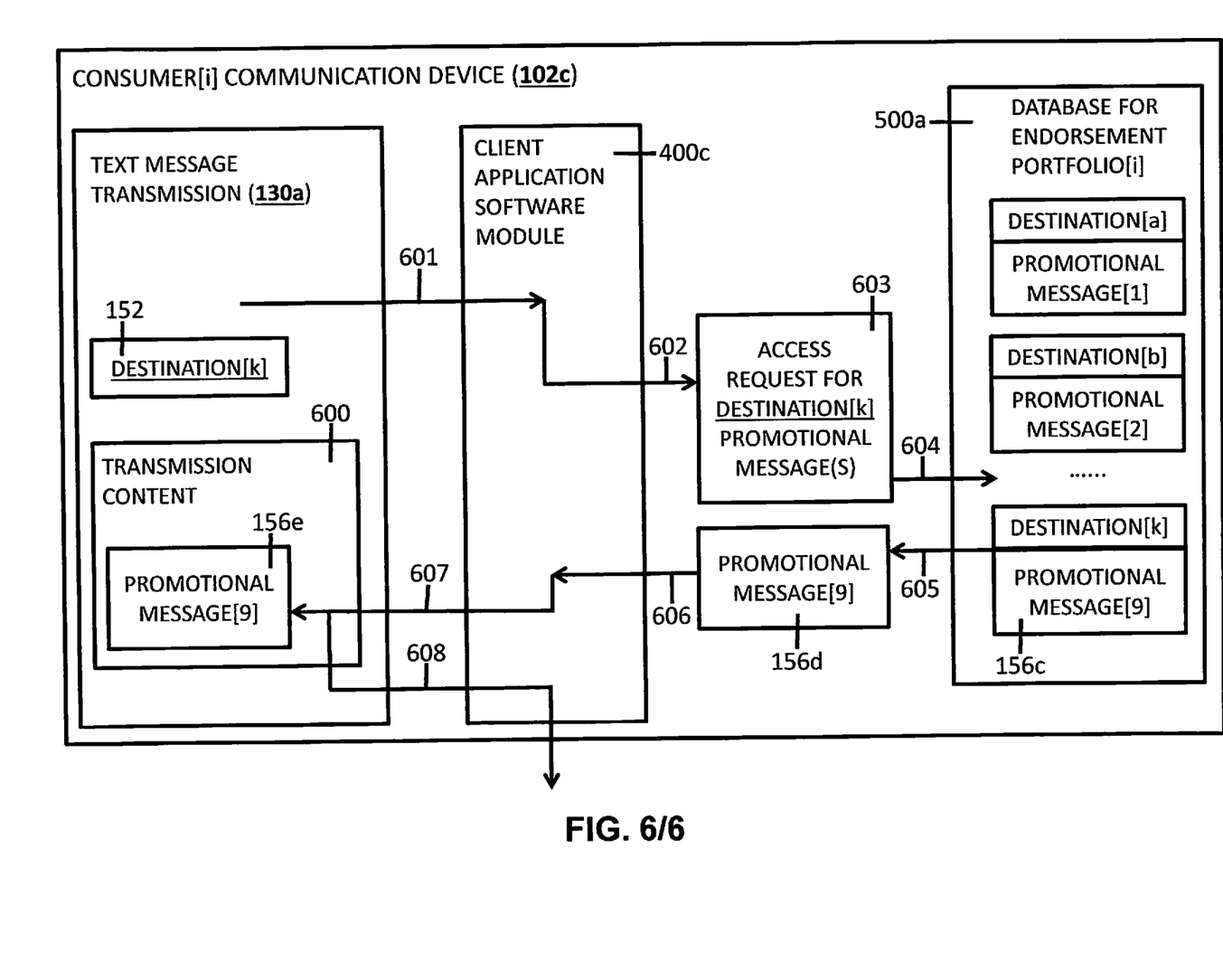
FIG. 6 is a process flow diagram illustrating the process by which one or more promotional messages get attached to a communication transmission originated by the sender, in accordance with a second embodiment of the disclosed system and method.

FIG. 6 is a process flow diagram illustrating the process by which one or more promotional messages get attached to a communication transmission originated by a sending subscriber, in accordance with a second embodiment of the disclosed system and method.

Referring now to FIG. 6, the CASM 400c intercepts 601 the communication transmission 130a originated by the sender before it leaves the sender's communication device 102c and obtains the identifier 150 of the destination communication device that the transmission is being sent to. Then, the CASM 400c sends 602 an access request 603 (i.e., queries) to n the local database 500a containing the sending subscriber's endorsement portfolio for at least one promotional targeting record where the destination identifier field value matches the identifier of the destination communication device. If one or more promotional targeting record matches 156c (or 'hits') are found, the CASM 400c retrieves 605 from the local database 500a at least one promotional message 156d associated with a matching promotional targeting record and attaches 607 the retrieved promotional message 156e to the contents 600 of the intercepted communication transmission 130a. It should be noted that the source identifier for all the promotional targeting records stored in the local database 500a is equal to the identifier of sender's communication device. Once the attaching 607 of the retrieved promotional message 156e to the intercepted transmission 130a is completed, the transmission is forwarded 608 to its destination and exits the sender's communication device 102c.

With the above embodiment in mind, it should be understood that the disclosed system can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the disclosed system and method are useful machine operations. The disclosed system and method also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing description has been directed to a particular embodiment of the present disclosure, it should be understood that those skilled in the art may make various changes, substitutions and alterations herein without departing from the spirit and scope of the present disclosure. For example, the communication transmission between the sender and the receiver can be a voice call, a videoconference call, or an e-mail transmission where the source and destination communication identifiers refer to e-mail addresses associated with storage memory resources allocated and residing on a remote computer server.

Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A web server device storing, and providing download access to, a set of processor-executable software instructions configured to cause a processor in a client mobile communication device (MCD) to perform the steps of:
   receiving, by the processor in the client MCD, a plurality of data targeting records (DTRs), wherein a) each of said DTRs is associated with a source MCD identifier identifying the client MCD, and b) each of said DTRs comprises: 1) a destination MCD identifier identifying a MCD other than the client MCD, and 2) a data message;
   storing, by the processor in the client MCD, each of said DTRs in a local memory residing in the client MCD;
   identifying, by the processor in the client MCD, a transmission of an outbound data communication message (DCM) that is originated from the client MCD and is addressed to a recipient MCD; and,
   responsive to identifying the transmission of the outbound DCM, performing, by the processor in the client MCD, the steps of: a) identifying, in the local memory, at least one of said DTRs having a destination MCD identifier identifying the recipient MCD; and, b) inserting the data message from the identified at least one of said DTRs to the outbound DCM.

2. The web server device of claim 1, wherein the web server device is further performing the steps of: 1) implementing a web-based user interface (WUI) configured to a) accept said each of said DTRs, and b) associate said each of said DTRs with the source MCD identifier identifying the client MCD; 2) receiving said each of said DTRs accepted by the WUI; and 3) storing said each of said DTRs in a database configured to store the plurality of DTRs.

3. A non-transitory computer readable storage medium having stored thereon a set of processor-executable software instructions configured to cause a processor in a client mobile communication device (MCD) to perform the steps of:
   receiving, by the processor in the client MCD, a plurality of data targeting records (DTRs), wherein a) each of said DTRs is associated with a source MCD identifier identifying the client MCD, and b) each of said DTRs comprises: 1) a destination MCD identifier identifying a MCD other than the client MCD, and 2) a data message;
   storing, by the processor in the client MCD, each of said DTRs in a local memory residing in the client MCD;
   identifying, by the processor in the client MCD, a transmission of an outbound data communication message (DCM) that is originated from the client MCD and is addressed to a recipient MCD; and,
   responsive to identifying the transmission of the outbound DCM, performing, by the processor in the client MCD, the steps of: a) identifying, in the local memory, at least one of said DTRs having a destination MCD identifier identifying the recipient MCD; and, b) inserting the data message from the identified at least one of said DTRs to the outbound DCM.

4. A first mobile communication device (MCD) comprising a processor and non-transitory memory having stored thereon a set of processor-executable software instructions configured to cause the processor in the first MCD to perform the steps of:
   receiving, by the processor in the first MCD, a plurality of data targeting records (DTRs), wherein a) each of said DTRs is associated with a source MCD identifier identifying the first MCD, and b) each of said DTRs comprises: 1) a destination MCD identifier identifying a MCD other than the first MCD, and 2) a data message;
   storing, by the processor in the first MCD, each of said DTRs in a local memory residing in the first MCD;
   identifying, by the processor in the first MCD, a transmission of an outbound data communication message (DCM) that is originated from the first MCD and is addressed to a second MCD; and,
   responsive to identifying the transmission of the outbound DCM, performing, by the processor in the first MCD, the steps of: a) identifying, in the local memory, at least one of said DTRs having a destination MCD identifier identifying the second MCD; b) inserting the data message from the identified at least one of said DTRs to the outbound DCM; and c) transmitting the outbound DCM to the second MCD.

5. The web server device of claim 1, wherein the data message in each of said DTRs comprises a web link.

6. The non-transitory computer readable storage medium of claim 3, wherein the data message in each of said DTRs comprises a web link.

7. The first MCD of claim 4, wherein the data message in each of said DTRs comprises a web link.

8. The web server device of claim 1, wherein each of said DTRs further comprises the source MCD identifier identifying the client MCD.

9. The non-transitory computer readable storage medium of claim 3, wherein each of said DTRs further comprises the source MCD identifier identifying the client MCD.

10. The first MCD of claim 4, wherein each of said DTRs further comprises the source MCD identifier identifying the first MCD.

11. The web server device of claim 2, wherein the receiving step comprises the step of requesting each of said DTRs from the database.

12. The non-transitory computer readable storage medium of claim 3, wherein the receiving step comprises the step of requesting each of said DTRs from a database configured to store each of said DTRs.

13. The first MCD of claim 4, wherein the receiving step comprises the step of requesting each of said DTRs from a database configured to store each of said DTRs.

14. A peer-to-peer electronic messaging system for messages addressed to mobile communication devices (MCDs), the system comprising:
   a) a first computing device hosting a database, the first computing device performing the steps of: a1) receiving a new targeting record created by a mobile subscriber from a plurality of mobile subscribers, the new targeting record comprising: 1) A source MCD identifier identifying a MCD associated with the mobile subscriber, 2) a destination MCD identifier, and 3) a data message selectable from a plurality of data messages published on the Internet; and a2) storing the new targeting record in the database, wherein: a2-a) the database is storing a set of targeting records created by said plurality of mobile subscribers, a2-b) each of said targeting records comprises: 1) a source MCD identifier, 2) a destination MCD identifier, and 3) a data message selectable from said plurality of data messages, and a2-c) the new targeting record storing step comprises adding the new targeting record to the set of targeting records; and,
   b) a second computing device that is communicatively coupled to the first computing device, the second computing device performing the steps of: b1) identifying a transmission of a data communication message (DCM) addressed to a recipient MCD; b2) retrieving, from the database, a data set comprising the data message from at least one of said targeting records having a destination MCD identifier identifying the recipient MCD; and, b3) transmitting the retrieved data set to the recipient MCD.

15. The system of claim 14, wherein the first computing device is further performing the step of receiving input causing the removal from the database of a subset of targeting records, wherein each of the targeting records in the subset of targeting records has a source MCD identifier identifying the MCD associated with the mobile subscriber.

16. The system of claim 14, wherein the transmitting step comprises the steps of: a) adding the retrieved data set to the DCM; and, b) transmitting the DCM to the recipient MCD.

17. The system of claim 16, wherein: a) the DCM is originated by a sender MCD; b) the transmission identifying step comprises the step of intercepting the DCM; c) the DCM comprises a source communication identifier identifying the sender MCD; and, d) the source MCD identifier in the at least one of said targeting records identifies the sender MCD.

18. The system of claim 14, wherein: a) the DCM is originated by a sender MCD; b) the transmission identifying step comprises the step of intercepting the DCM; c) the DCM comprises a source communication identifier identifying the sender MCD; and, d) the source MCD identifier in the at least one of said targeting records identifies the sender MCD.

19. The system of claim 14, further comprising a third computing device that is communicatively coupled to the first computing device, the third computing device performing the steps of: a) implementing a web-based user interface (WUI) configured to accept the new targeting record from the mobile subscriber; b) accepting the new targeting record from the mobile subscriber via the WUI; and, c) sending the new targeting record to the first computing device.

20. The system of claim 19, wherein the third computing device is further performing the steps of storing, and providing Internet access to, each of said data messages published on the Internet.

21. The system of claim 14, wherein the data message from the at least one of said targeting records comprises a web link.

22. The system of claim 16, wherein the data message from the at least one of said targeting records comprises a web link.

23. The system of claim 17, wherein the data message from the at least one of said targeting records comprises a web link.

24. The system of claim 14, wherein the DCM comprises a webpage.

25. The system of claim 24, wherein the second computing device is further performing the steps of a) generating the webpage, and b) generating the DCM.

26. The system of claim 25, wherein: a) the second computing device is further performing the steps of: a1) implementing a web-based user interface (WUI) configured to accept the new targeting record from the mobile subscriber, a2) accepting the new targeting record from the mobile subscriber via the WUI, and a3) sending the new targeting record to the first computing device; and, b) the source MCD identifier in the new targeting record identifies the recipient MCD.

27. The system of claim 26, wherein the second computing device is further performing the steps of storing, and providing Internet access to, each of said data messages published on the Internet.

28. The system of claim 24, wherein a) the webpage comprises a data content display, and b) the retrieved data set is transmitted to the recipient MCD via the data content display.

29. The system of claim 25, wherein a) the webpage comprises a data content display, and b) the retrieved data set is transmitted to the recipient MCD via the data content display.

30. The system of claim 26, wherein a) the webpage comprises a data content display, and b) the retrieved data set is transmitted to the recipient MCD via the data content display.

31. A method performed by a system of one or more computing devices, the method comprising the steps of:
   receiving a new targeting record created by a mobile subscriber from a plurality of mobile subscribers, the new targeting record comprising: 1) a source mobile communication device (MCD) identifier identifying a MCD associated with the mobile subscriber, 2) a destination MCD identifier, and 3) a data message selectable from a plurality of data messages published on the Internet;
   storing the new targeting record in a non-transitory memory storage coupled with at least one of said one or more computing devices, wherein: a) the non-transitory memory storage is storing a set of targeting records created by said plurality of mobile subscribers, b) each of said targeting records comprises: 1) a source MCD identifier, 2) a destination MCD identifier, and 3) a data message selectable from said plurality of data messages, and c) the new targeting record storing step comprises adding the new targeting record to the set of targeting records;
   identifying a transmission of a data communication message (DCM) addressed to a recipient MCD;
   retrieving, from the non-transitory memory storage, a data set comprising the data message from at least one of said targeting records having a destination MCD identifier identifying the recipient MCD; and,
   transmitting the retrieved data set to the recipient MCD.

32. The method of claim 31, wherein the receiving step comprises the steps of: 1) implementing a web-based user interface (WUI) configured to accept the new targeting record from the mobile subscriber; and, 2) accepting the new targeting record from the mobile subscriber via the WUI.

33. The method of claim 32, further comprising the step of receiving input, via the WUI, causing the removal from the non-transitory memory storage of a subset of targeting records, wherein each of the targeting records in the subset of targeting records has a source MCD identifier identifying the MCD associated with the mobile subscriber.

34. The method of claim 31, wherein the transmitting step comprises the steps of: a) adding the retrieved data set to the DCM; and, b) transmitting the DCM to the recipient MCD.

35. The method of claim 34, wherein: a) the DCM is originated by a sender MCD; b) the transmission identifying step comprises the step of intercepting the DCM; c) the DCM comprises a source communication identifier identifying the sender MCD, and, d) the source MCD identifier in the at least one of said targeting records identifies the sender MCD.

36. The method of claim 31, wherein: a) the DCM is originated by a sender MCD; b) the transmission identifying step comprises the step of intercepting the DCM; c) the DCM comprises a source communication identifier identifying the sender MCD, and, d) the source MCD identifier in the at least one of said targeting records identifies the sender MCD.

37. The method of claim 31, wherein the data message from the at least one of said targeting records comprises a web link.

38. The method of claim 34, wherein the data message from the at least one of said targeting records comprises a web link.

39. The method of claim 35, wherein the data message from the at least one of said targeting records comprises a web link.

40. The method of claim 31, wherein the DCM comprises a webpage.

41. The method of claim 40, further comprising the steps of a) generating the webpage, and b) generating the DCM.

42. The method of claim 41, wherein: a) the receiving step comprises the steps of: a1) implementing a web-based user interface (WUI) configured to accept the new targeting record from the mobile subscriber, and a2) accepting the new targeting record from the mobile subscriber via the WUI; and, b) the source MCD identifier in the new targeting record identifies the recipient MCD.

43. The method of claim 40, wherein a) the webpage comprises a data content display, and b) the retrieved data set is transmitted to the recipient MCD via the data content display.

44. The method of claim 41, wherein a) the webpage comprises a data content display, and b) the retrieved data set is transmitted to the recipient MCD via the data content display.

45. The method of claim 42, wherein a) the webpage comprises a data content display, and b) the retrieved data set is transmitted to the recipient MCD via the data content display.

* * * * *